(12) United States Patent
Blanck et al.

(10) Patent No.: US 7,261,566 B2
(45) Date of Patent: Aug. 28, 2007

(54) SYSTEM AND METHOD FOR TRAINING MEDICAL PROFESSIONALS TO PERFORM A NERVE BLOCK PROCEDURE

(75) Inventors: Thomas J. J. Blanck, Brooklyn, NY (US); Igor Nikonorov, Whitestone, NY (US)

(73) Assignee: New York University, New York, NY (US)

( * ) Notice: Subject to any disclaimer, the term of this patent is extended or adjusted under 35 U.S.C. 154(b) by 763 days.

(21) Appl. No.: 10/426,172

(22) Filed: Apr. 28, 2003

(65) Prior Publication Data
US 2004/0214149 A1    Oct. 28, 2004

(51) Int. Cl.
G09B 23/28 (2006.01)
(52) U.S. Cl. .................. 434/272; 434/262
(58) Field of Classification Search ......... 434/262–275
See application file for complete search history.

(56) References Cited

U.S. PATENT DOCUMENTS 5,391,081 A * 2/1995 Lampotang et al. ........ 434/262
5,882,207 A * 3/1999 Lampotang et al. ........ 434/268
6,443,735 B1 * 9/2002 Eggert et al. ............... 434/262
6,773,263 B2 * 8/2004 Nicholls et al. ............ 434/267

OTHER PUBLICATIONS

Blezek et al., Virtual reality Simulation of Regional Anesthesia for Training of Residents, 2000, proceedings of the 33rd Hawaii International Conference on System Sciences, IEEE, pp. 1-8.*
Singh et al., Design of an Interactive Lumbar Puncture Simulator with Tactile Feedback, 1994, IEEE, pp. 1734-1739.*
Abbod et al., Anaesthesia Simulator: Intelligent Monitoring and Control of Depth of Anaesthesia, 1998, IEEE, pp. 1-5.*

* cited by examiner

*Primary Examiner*—Robert E. Pezzuto
*Assistant Examiner*—Cameron Saadat
(74) *Attorney, Agent, or Firm*—Fay Kaplun & Marcin, LLP

(57) ABSTRACT

Described is a method and system for training medical professionals to perform a nerve block procedure. The system may include a nerve electrode at least partially inserted in a conductive gel and an NSMRD supplying a current signal to a needle which is inserted in the gel. The system may also include a processing arrangement which is connected to the NSMRD. The processing arrangement receives a transmitted current from the nerve electrode via the needle and measures a voltage drop. The measured voltage drop increases as a distance between the needle and the nerve electrode decreases.

21 Claims, 4 Drawing Sheets

System 1

SYSTEM AND METHOD FOR TRAINING MEDICAL PROFESSIONALS TO PERFORM A NERVE BLOCK PROCEDURE

BACKGROUND

Regional anesthesia is becoming a more popular and frequently used mode of anesthesia since only an operative area of a patient is anesthetized and thus, potentially minimizing side effects that occur with general anesthesia. Regional anesthesia involves the localization of a nerve with an electrical impulse and the deposition of local anesthetic around the nerve leading to the blockade of nerve transmissions and successful anesthesia.

Medical professionals ("MPs"), such as anesthesiologists, surgeons and medical students, perform a large number of the regional anaesthetics including nerve blocking procedures. The number of nerve blocking procedures grows every year. The availability of training for this procedure, however, is still based on a conventional technique involving a patient. In particular, the MP-in-training uses actual patients to perfect his skills. This technique is expensive and requires a high degree of special safety training for the MP in order to adequately address the health and safety concerns of the test patient.

There is a need for a system and method that provides a training tool for the MPs which is more effective and less expensive than the conventional techniques.

SUMMARY OF THE INVENTION

The present invention is related to a method and system for training medical professionals to perform a nerve block procedure. The system may include a nerve electrode at least partially inserted in a conductive gel and a nerve simulator muscular response device "NSMRD" supplying a current signal to a needle which is inserted in the gel. The system may also include a processing arrangement which is connected to the NSMRD. The processing arrangement receives a transmitted current from the nerve electrode via the needle and measures a voltage drop. The measured voltage drop increases as a distance between the needle and the nerve electrode decreases.

The method according to the present invention may include the following steps. A first signal corresponding to a measured voltage in a first circuit is received. The first circuit may include an NSMRD, a needle, a conductive gel and a nerve electrode. A second signal corresponding to a reference voltage is received. The reference voltage corresponds to a predetermined distance. The first signal is compared to the second signal. The first signal is greater than the second signal when a distance between the needle and the nerve electrode is smaller than the predetermined distance. An output signal is transmitted when the first signal is greater than the second signal.

BRIEF DESCRIPTION OF THE DRAWINGS

The accompanying drawings are included to provide a further understanding of the invention and are incorporated in and constitute part of the specification, illustrate several embodiments of the invention and, together with the description, serve to explain examples of the present invention. In the drawings.

DETAILED DESCRIPTION

Figure 1:
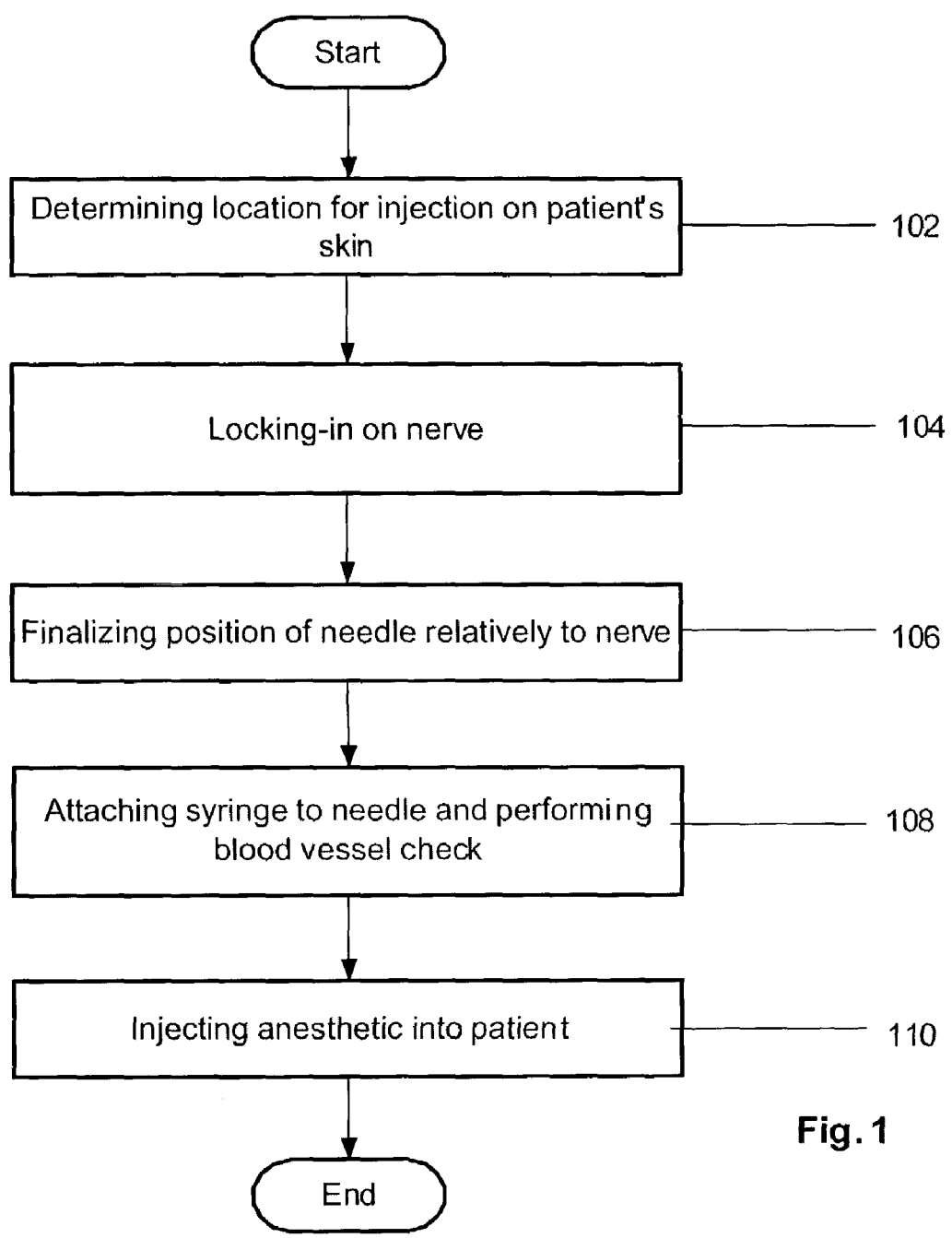
FIG. 1 is a method for a nerve block procedure.

FIG. 1 shows a method for a nerve block procedure. In step 102, the MP finds a location for an anesthetic injection on the patient's skin. Throughout this description the term "MP" (medical professional) will be used to describe any person who may be trained to perform a nerve block procedure. Usually, the MP may utilize a ruler and a marker to pinpoint the specific location on the patient's skin.

In step 104, the MP "locks-in" on the nerve using a needle which is attached to a nerve simulator muscular response device ("NSMRD"). In particular, the MP inserts the needle into the patient's skin at the marked location. The MP attempts to get as close as possible to the nerve. In order to accomplish that, the MP activates the NSMRD which sends an electrical current through the needle to the patient. Initially, the NSMRD may output a relatively high electrical current (e.g., $I_{NSMRD} > 1.0$ mA). If the needle is close to the nerve, then the patient's muscle begins to contract. The MP looks for contractions in the specified muscles depending on the particular nerve that is to be blocked.

The MP then finalizes the position of the needle by finely manipulating the needle closer to the nerve. While performing this fine manipulation, the current output of the NSMRD is decreased. The position of the needle is finalized when the current output of the NSMRD is below a minimum threshold (e.g., $I_{NSMRD} < 0.5$ mA), but the muscle contractions continue. (Step 106).

Then, the MP attaches a syringe to the needle and performs a blood vessel check. (Step 108). If blood appears, then the MP must remove the needle and repeat steps 102-106. Finally, the MP injects the anesthetic into the patient. (Step 110).

These steps and, in particular, steps 104 and 106 require a special training because, e.g., during steps 104 and 106, the MP must perform a "blind" search to locate the nerve. In other words, the MP cannot clearly see the nerve and the tip of the needle. In addition, steps 104 and 106 carry a high risk of a nerve injury. The rate of sustained block strongly depends on how close the nerve is to the point of anesthetic injection (i.e., the needle's tip).

Figure 2:
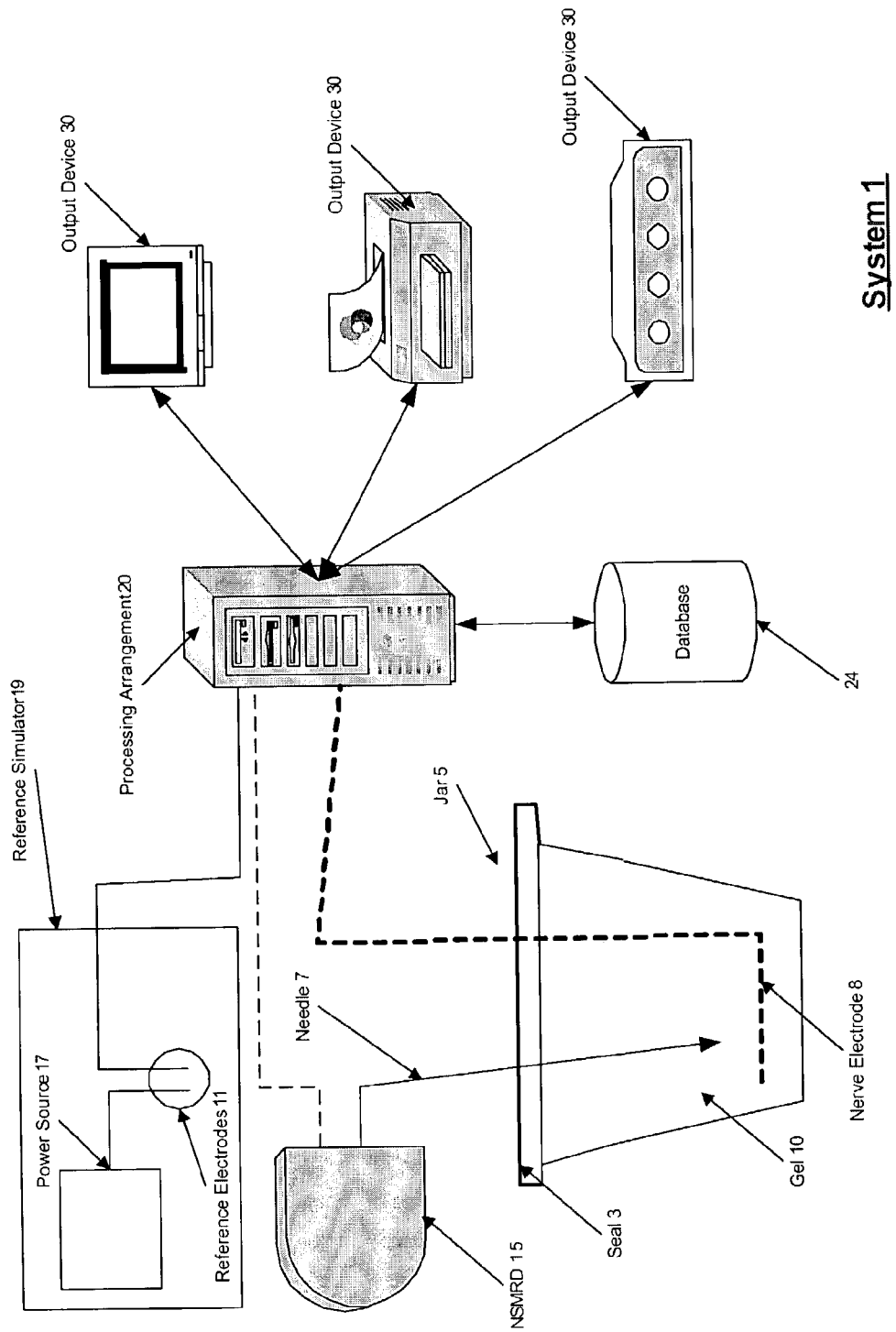
FIG. 2 shows an exemplary embodiment of a training system for the nerve block procedure according to the present invention.

FIG. 2 shows an exemplary embodiment according to the present invention of a system 1 for training MPs to perform the nerve block procedure and, in particular, to perform the steps 104 and 106 as illustrated in FIG. 1. The system 1 allows MPs to acquire the necessary skills of needle manipulation prior to encountering a patient and minimizes the time required to become proficient at locating the nerve.

The system 1 may include a jar 5 which is at least partially filled with a conductive gel 10. The conductive gel 10 models the flesh present below the skin of an actual patient. The gel 10 may have an electrical resistance $R_{Gel}$ ranging between, e.g., 10 and 20 k$\Omega$. The resistance of the gel 10 may be dependent on the distance the electric signal travels in the gel 10. The gel 10 is sealed in the jar 5 with the skin-like seal 3 on the top which models the skin of an actual patient. The gel 10 may also include a gel filler (not shown) to mimic the mechanical structure of muscle tissue. The gel filler may be, for example, a fibrous material or a particulate material. The gel filler may add mechanical resistance to the gel 10 to provide a more realistic feel to the MP using the system 1. In addition, the gel containers may be incorporated into a human body dummy to improve the visual presentation of the simulation.

The system 1 also includes a needle 7 which is attached to the NSMRD 15. To allow the MP to become thoroughly familiar with the nerve block procedure, the needle 7 and the NSMRD 15 may be the same instruments that the MP would use in an actual nerve block procedure. The NSMRD 15 may produce a current $I_{NSMRD}$ ranging between, e.g., 0.1 and 2.0 mA. The NSMRD 15 may be connected to a processing arrangement 20 in order to collect data on the manipulation of the NSMRD 15 by the MP during the training simulation.

The system 1 may also include a nerve electrode 8 situated in the jar 5 and at least partially placed into the gel 10. The nerve electrode 8 may be placed in various locations within the jar 5 to model the variability of nerve locations within actual patients. The nerve electrode 8 may also include a layered conductive coating to provide a differentiated resistance for the nerve electrode 8, e.g., 3 levels of conductive coatings. This differentiated resistance may increase the gradation level of a measured voltage (described in greater detail below) in the close vicinity of the nerve electrode 8.

In a further exemplary embodiment, the nerve electrode 8 may be partially insulated to provide a window of exposed wire or conductive coating of the nerve electrode 8. The insulation may improve the distance response of the system 1 as the needle 7 approaches the nerve electrode 8 without sacrificing the quality of the simulation. The insulation may dampen or eliminate the effects of, for example, the electric field effect that may occur in the vicinity of the ends of the nerve electrode 8.

The nerve electrode 8 is connected to a processing arrangement 20 which is discussed in more detail below. The processing arrangement 20 may also include a database 24 to store data for various training scenarios. The processing arrangement 20 is attached an output device 30, such as a monitor, a printer, LEDs, etc.

The system 1 also includes a reference voltage source 19 which is comprised of a power source 17 and reference electrodes 11. As will be described in greater detail below, the reference electrodes 11 may be positioned at a predetermined distance and a reference voltage ($U_{ref}$) may be obtained using the power source 17.

Figure 3:
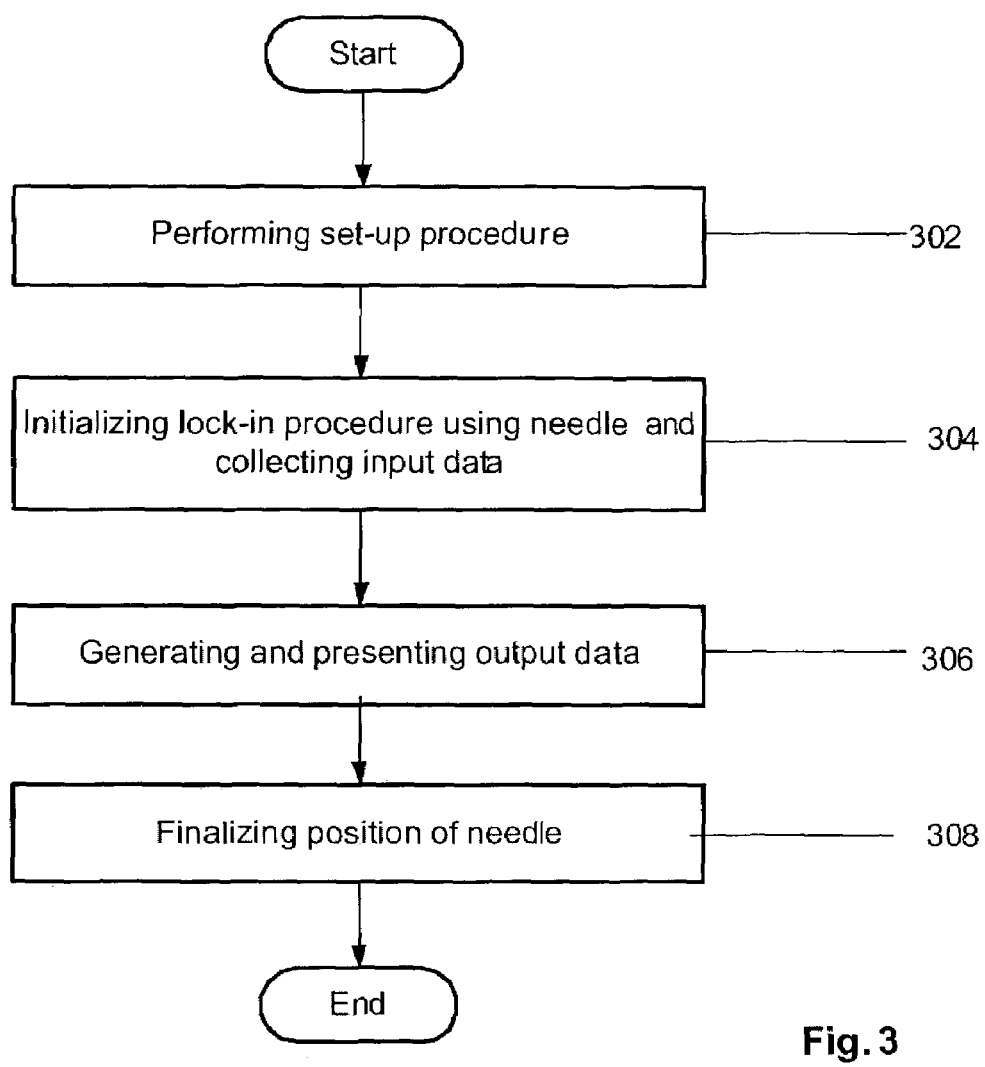
FIG. 3 shows an exemplary embodiment of a method according to the present invention.

FIG. 3 shows an exemplary method according to the present invention for training MPs to perform the nerve block procedure. In step 302, the MP (or a trainer) performs a set-up procedure. In particular, the jar 5 is filled with the gel 10. Then, the nerve electrode 8 is inserted in the jar 5 in the correct location to simulate the location of the particular nerve to be simulated. The nerve electrode 8 is coupled to the processing arrangement 20 to obtain input data. Those with skill in the art will understand that the processing arrangement 20 may include a processor (or computing device) containing algorithms or software which perform the functions described for the processing arrangement 20. The processing arrangement 20 may also include electrical or electronic components (e.g., resistors, capacitors, operational amplifiers, etc.) which perform the described functions. The processing arrangement 20 may also be a combination of processor and/or electronic components.

Continuing with the set up procedure, the needle 7 is attached to the NSMRD 15 which is coupled to the processing arrangement 20. The NSMRD is initially set to deliver a relatively high current (e.g., $I_{NSMRD}$>1.0 mA). As will be described in greater detail below, the system 1 provides a graded output response when the distance between the needle 7 and the nerve electrode 8 is less than the reference distance between the reference electrodes 11. The reference distance between the reference electrodes 11 may depend on the level of skill of the MP and/or the particular nerve block procedure to be simulated. For example, the reference electrodes 11 may be situated at a greater distance for relatively inexperienced MPs. The greater the difference between the reference electrodes 11, the easier the nerve can be locked in from a greater distance. In a further example, the distance between the reference electrodes 11 may be set based on the excitability of different nerves. When the reference distance is set, the power source 17 may be activated and the reference voltage ($U_{ref}$) may be determined by the processing arrangement 20.

In step 304, the MP may begin the nerve block procedure simulation. The system 1 allows the MP to insert the needle 7 through a "skin" (e.g., the cover 3) into the jar 5 having a "limb" (e.g., the gel 10) which contains a wire (e.g., the nerve electrode 8) that is used as the surrogate nerve. When the needle 7 is inserted through the cover 3 and into the gel 10, an electrical circuit is created which allows the current $I_{NSMRD}$ of the NSMRD 15 to flow through the needle 7, the gel 10, the nerve electrode 8 to the processing arrangement 20. This circuit allows for the measurement of a voltage drop ($U_{meas}$) in the circuit. This voltage drop ($U_{meas}$) may be measured across a resistor that is part of the processing arrangement 20 or simply through an algorithm in the processing arrangement 20 based on the input current from the above described circuit. Those with skill in the art will understand that the measured voltage drop ($U_{meas}$) may be inverted based on the particular arrangement of the input circuit. However, the exemplary embodiment of the present invention is not dependent on whether the measured voltage drop is inverted. As the needle 7 approaches the surrogate nerve 8, the measured voltage drop ($U_{meas}$) increases.

At this point in the process, the processing arrangement 20 has values for both the reference voltage drop ($U_{ref}$) and the measured voltage drop ($U_{meas}$). In step 306, the processing arrangement 20 compares the $U_{ref}$ to the $U_{meas}$ to obtain an output voltage ($U_{out}$) using the following formula:

$$U_{out}=0 \text{ if } U_{meas} \leq U_{ref}$$

$$U_{out}=k \ |U_{meas}-U_{ref}|;$$

where k is a desirable gain of the processing arrangement 20

As can be seen from the above formula, the output voltage ($U_{out}$) will be zero (0) as long as $U_{ref}$ is greater than or equal to $U_{meas}$. With reference to the system 1, the output voltage ($U_{out}$) remains zero as long as the distance between the needle 7 and the nerve electrode 8 is greater than the reference distance between the reference electrodes 11. When the MP has manipulated the needle 7 within a distance of the nerve electrode 8 which is less than the reference distance, the output voltage ($U_{out}$) is positive. Subsequently, the processing arrangement 20 generates output data (which may include $U_{out}$) for presenting it to the MP via the output device 30.

As described above, the output sent by the processing arrangement 20 to the output device 30 may be a graded output response indicating the relative distance between the needle 7 and the surrogate nerve 8. The graded output response may be a graph indicating the value of the output voltage (e.g., as the needle 7 approaches the surrogate nerve 8 the voltage increases), for example, a set of LEDs where more are lit as the needle 7 approaches the surrogate nerve 8, etc.

Figure 4A:
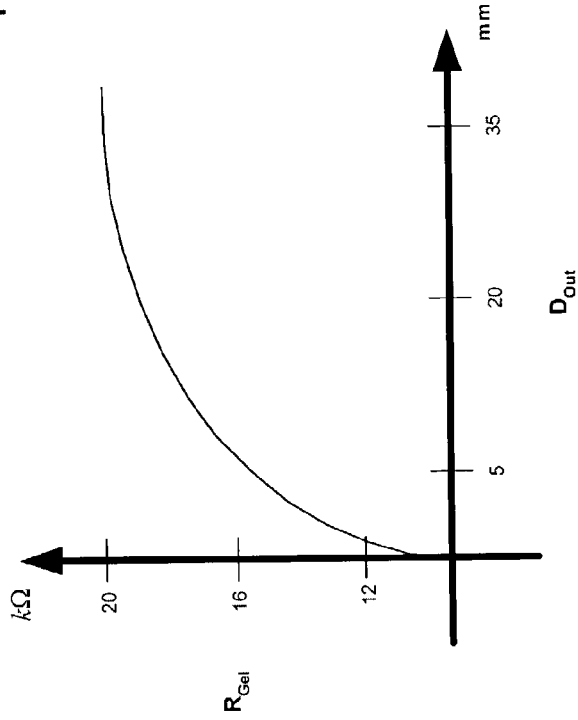
FIG. 4a shows a graph illustrating a relationship between gel resistance and a distance between a needle and a nerve electrode.
Figure 4B:
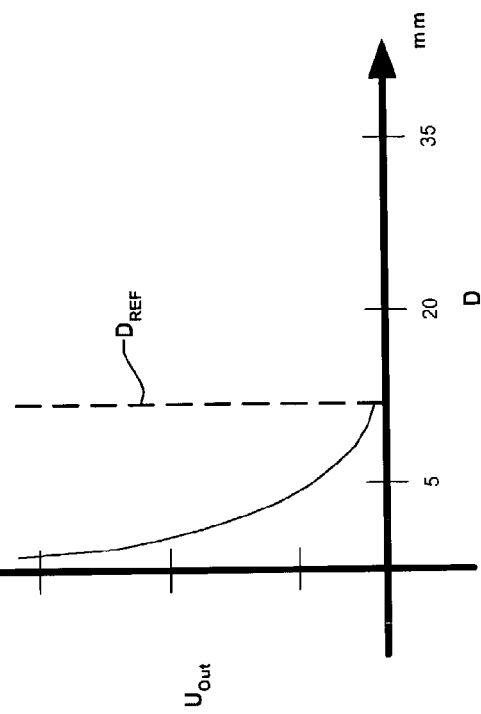
FIG. 4b shows a graph illustrating a relationship between a voltage drop $U_{out}$ and a distance between the needle and the nerve electrode.

FIG. 4a shows a first exemplary graphical output illustrating a relationship between the gel resistance ($R_{Gel}$) and a distance $D_{Out}$ between the needle 7 and the nerve electrode 8. FIG. 4b shows a second exemplary graphical output illustrating a relationship between the output voltage ($U_{out}$) and the distance D. In this curve of FIG. 4b, an exemplary reference distance ($D_{REF}$) is shown. The output voltage ($U_{out}$) is shown to increase as the distance D becomes smaller than the reference distance ($D_{REF}$). Those with skill in the art will understand that there is a correlation between the values of $R_{Gel}$, $D_{Out}$, $U_{out}$, $U_{meas}$ and $I_{NSMRD}$. In various instances, some of the values for these variables are known and the values for the remaining values may be determined using a simple calibration procedure for the system 1. Thus, the output values for these and other graphical outputs may be stored in the processing arrangement 20.

When the MP receives the initial output from system 1, this is an indication that the distance between the needle 7 and the surrogate nerve 8 is now less than the reference distance between the reference electrodes 11. This indication correlates to the initial muscle contractions in an actual nerve block procedure. The process then continues to step 308 where the MP practices finalizing the position of the needle 7, so it is in the optimum position for the injection of anesthetic.

As described above, the finalizing of the position of needle 7 is performed in conjunction with the varying of the current output of the NSMRD 15. A successful nerve block procedure is often achieved when the intensity of the current $I_{NSMRD}$ is less than a predetermined current level (e.g., 0.5 mA), but the muscle continues to contract. Thus, in step 308, the MP continues to advance the needle 7 in the direction of the surrogate nerve 8 and also practice varying level of the current $I_{NSMRD}$. The MP continues to receive feedback from the output device 30 as this process continues.

The processing arrangement 20 may also include a nerve damage alarm which may be indicated to the MP via the output device 30. If the needle touches the nerve during a nerve block procedure, it may lead to permanent damage to the nerve or a related muscle. Thus, the system 1 may include a nerve damage alarm to indicate when the needle 7 touches the nerve electrode 8 during a simulated nerve block procedure.

Those with skill in the art will understand that as the MP decreases the current $I_{NSMRD}$, the measured voltage ($U_{meas}$) also decreases. The decrease in the current $I_{NSMRD}$ is sensed and indicated by the output device 30. As the current $I_{NSMRD}$ is decreased, the output of the power source 17 may also be decreased so that the relationship between $U_{meas}$ and $U_{ref}$ remains constant. In another example, the processing arrangement 20 may include an operational amplifier which amplifies the signal when the current $I_{NSMRD}$ is decreased. Other manners of compensating for the decreased current will be apparent to those skilled in the art. Thus, as the MP moves the needle 7 closer to the surrogate nerve 8, the output response as displayed by the output device 30 remains a consistent graded output (i.e., as the needle 7 approaches the surrogate nerve 8, the displayed output increases, assuming the MP has correctly varied the current $I_{NSMRD}$ as the approach is taking place).

When the MP has moved the needle 7 into a position where a level of the current $I_{NSMRD}$ is below the required threshold and the output device 30 is continuing to display a signal consistent with muscle contraction, the MP has successfully manipulated the needle 7 and the NSMRD 15 for a nerve block procedure. A viewing window (not shown) may be included in the design of the jar 5 to allow a visual measurement of the distance between the needle 7 and the nerve electrode 8 as a check on the MP's progress either during the training session or at the completion of the session. Thus, the system 1 allows the MP to become proficient at manipulating the NSMRD 15 and the needle 7 as the needle 7 approaches the nerve 8.

The processing arrangement 20 may record the data corresponding to the actions of the MP during the training session. This data may be stored in the database 24 of the processing arrangement 20. Multiple sets of data may be kept to analyze the performance of the MP. For example, the processing arrangement 20 may record the amount of time for the needle 7 to arrive at the optimum location, the manipulation of the current $I_{NSMRD}$, a time curve of $U_{OUT}$, etc.

In an alternative exemplary embodiment, the processing arrangement 20 may include a data set of reference voltages which correspond to various reference distances of the reference electrodes 11. This data set may also be stored on the database 24 of the processing arrangement 20. When the MP was performing the set up procedure in step 302, the MP could enter the reference distance and the corresponding reference voltage data set which then might be used by the processing arrangement 20 when comparing the reference voltage ($U_{ref}$) to the measured voltage ($U_{meas}$).

In another alternative exemplary embodiment of the present invention, the system 1 may include a photo/video arrangement "PVA" (not shown). The PVA would allow to take photos and/or video of the above-described training procedure, e.g., using "a window opening" of the jar 5 along with the output data as it presented via the output device 30. Such photos/video would very helpful in training MPs. In particular, the MPs may review their hand movements and the corresponding output data in slow motion.

In a further alternative exemplary embodiment, the feedback to the MP may be video footage of the muscle contractions of an actual patient. For example, video fragments of actual patients undergoing a nerve block procedure may be filmed at different levels of stimulation. These video fragments may show various muscle contractions corresponding to the level of stimulation being provided. The system 1 may contain a library of these video fragments for each of the different type of nerve block procedures, e.g., sciatic nerve, femoral nerve, etc.

When an MP is using the system 1, the MP may be able to view a display screen which is an output device 30. The display screen will show the video, for the particular nerve block procedure being simulated, corresponding to the level of stimulation. The particular video fragment being displayed may correspond to the measured voltage ($U_{MEAS}$) being recorded by the processing arrangement 20. An algorithm may be used to extract and play the video fragment based on the amplitude of the measured voltage ($U_{MEAS}$).

One of the advantages of the present invention is that it provides an effective and inexpensive training tool for MPs for training to perform the never block procedure and replaces the use of humans for training purposes. Furthermore, the system 1 according to the present invention allows the MPs to develop intuitive skill of nerve location and consecutive nerve approach in a stress-free environment.

It will be apparent to those skilled in the art that various modifications and variations can be made in the structure and the methodology of the present invention, without departing from the spirit or scope of the invention. Thus, it is intended that at the present invention cover the modifications and variations of this invention provided they come within the scope of the appended claims and their equivalents.

What is claimed is:

1. A system, comprising:
   a nerve electrode at least partially inserted in a conductive gel;
   a nerve simulator muscular response device (NSMRD) supplying a current signal to a needle which is inserted in the gel;
   a processing arrangement connected to the NSMRD, the processing arrangement receiving a transmitted current from the nerve electrode via the needle and measuring a voltage drop, the processing arrangement determining a distance between the needle and the nerve electrode as a function of the voltage drop; and
   an output device for displaying an output data,
   wherein the measured voltage drop increases as the distance between the needle and the nerve electrode decreases.

2. The system according to claim 1, wherein the processing arrangement compares a reference voltage to the measured voltage, the reference voltage corresponding to a predetermined distance.

3. The system according to claim 2, wherein when the measured voltage is greater than the reference voltage, the distance between the needle and the nerve electrode is smaller than the predetermined distance.

4. The system according to claim 2, further comprising:
   a reference power source; and
   two reference electrodes located the predetermined distance apart, wherein the reference voltage is derived from a second circuit which includes the reference power source and the reference electrodes.

5. The system according to claim 2,
   wherein the output device displays the output data when the measured voltage is greater than the reference voltage.

6. The system according to claim 5, wherein the output data is graded based on an amount the measured voltage is greater than the reference voltage.

7. The system according to claim 5, wherein the output data is presented in a form of one of a graph output, an LED output and a video output.

8. The system according to claim 1, wherein a portion of the nerve electrode inserted into the conductive gel includes at least one conductive coating, a resistance of the conductive coating being less than a resistance of the conductive gel.

9. The system according to claim 1, wherein a portion of the nerve electrode inserted into the conductive gel is insulated.

10. The system according to claim 1, further comprising:
    a container, wherein the conductive gel at least partially fills the container, the container being covered with a skin-like cover and having a viewing window.

11. The system according to claim 1, further comprising:
    a nerve damage alarm indicating that the needle has contacted the nerve electrode.

12. The system according to claim 1, wherein the conductive gel includes a gel filler.

13. A method, comprising the steps of:
    inserting a needle in a conductive gel, the needle being electrically connected to a nerve simulator muscular response device (NSMRD) producing a current output;
    manipulating the needle to a predetermined distance from a surrogate nerve, the nerve being at least partially inserted into the conductive gel;
    determining the predetermined distance as a function of a transmitted current from the nerve electrode via the needle and a voltage drop corresponding thereto;
    outputting an output signal when the needle is within the predetermined distance from the surrogate nerve; and
    further manipulating the needle closer to the surrogate nerve in conjunction with manipulating the current output of the NSMRD using the output signal; and
    displaying the output signal.

14. The method of claim 13, wherein the current output of the NSMRD is initially set to greater than 1.0 mA.

15. The method of claim 13, wherein the current output of the NSMRD is manipulated to less than 0.5 mA while maintaining the output signal.

16. The method of claim 13, further comprising the step of:
    storing data corresponding to the manipulation of the needle.

17. The method of claim 13, wherein the output signal is one of a series of video fragments, each video fragment corresponding to a level of a measured voltage.

18. A method, comprising the steps of:
    receiving a first signal corresponding to a measured voltage in a first circuit, the first circuit including a nerve simulator muscular response device (NSMRD), a needle, a conductive gel and a nerve electrode;
    receiving a second signal corresponding to a reference voltage, wherein the reference voltage corresponds to a predetermined distance;
    comparing the first signal to the second signal, wherein the first signal is greater than the second signal when a distance between the needle and the nerve electrode is smaller than the predetermined distance; and
    sending an output signal when the first signal is greater than the second signal; and
    displaying the output signal.

19. The method according to claim 18, wherein the reference voltage is generated using a reference circuit including a power source and a set of reference electrodes which are spaced the predetermined distance apart.

20. The method according to claim 18, wherein the reference voltage is stored as a data set in a storage medium.

21. The method according to claim 18, wherein the output signal is one of a graph output, an LED output and a video output.

* * * * *